(12) United States Patent
Andersson

(10) Patent No.: US 12,054,914 B2
(45) Date of Patent: Aug. 6, 2024

(54) METHOD, DEVICE AND USER INTERFACE FOR PRESENTATION OF INFORMATION DESCRIBING A RUNNING OPERATING CONDITION OF A DEMOLITION ROBOT

(71) Applicant: Brokk Aktiebolag, Skellefteå (SE)

(72) Inventor: Stefan Andersson, Skellefteå (SE)

(73) Assignee: Brokk Aktiebolag, Skellefteå (SE)

( * ) Notice: Subject to any disclaimer, the term of this patent is extended or adjusted under 35 U.S.C. 154(b) by 352 days.

(21) Appl. No.: 17/428,206

(22) PCT Filed: Jan. 28, 2020

(86) PCT No.: PCT/SE2020/050064
§ 371 (c)(1),
(2) Date: Aug. 3, 2021

(87) PCT Pub. No.: WO2020/162809
PCT Pub. Date: Aug. 13, 2020

(65) Prior Publication Data
US 2022/0120056 A1    Apr. 21, 2022

(30) Foreign Application Priority Data
Feb. 5, 2019   (SE) .................................. 1950134-5

(51) Int. Cl.
*E02F 9/20* (2006.01)
*E02F 9/26* (2006.01)
*G05D 1/00* (2006.01)

(52) U.S. Cl.
CPC .............. *E02F 9/205* (2013.01); *E02F 9/264* (2013.01); *E02F 9/267* (2013.01); *G05D 1/0016* (2013.01)

(58) Field of Classification Search
CPC ........... E02F 9/205; E02F 9/264; E02F 9/267; G05D 1/0016
(Continued)

(56) References Cited

U.S. PATENT DOCUMENTS

| | | | |
|---|---|---|---|
| 5,327,347 A * | 7/1994 | Hagenbuch ............ | G07C 5/008 701/50 |
| 8,260,736 B1 * | 9/2012 | Lear ........................ | G06N 5/02 706/46 |

(Continued)

FOREIGN PATENT DOCUMENTS

| | | |
|---|---|---|
| CN | 102282321 | 12/2011 |
| EP | 2508680 | 10/2012 |

(Continued)

OTHER PUBLICATIONS

Extended European Search Report received for European Patent Application No. 20751950.5 mailed on Jan. 25, 2023, 11 pages.
(Continued)

*Primary Examiner* — Richard A Goldman
(74) *Attorney, Agent, or Firm* — Morrison & Foerster LLP

(57) ABSTRACT

The invention relates to a solution for presenting information describing a running operating condition of a demolition robot (3:1), provided with a microprocessor (24), a memory (26), wherein current data are obtained by sensors (21) as well as recorded and compiled into a data file (db1:1-db1:n) for each recording instance. According to the invention, a data file with specific reference data (27) is recorded in the demolition robot's memory, current sensor data (21) that deviate from recorded specific reference data and thereby can affect the running operating condition of the demolition robot are identified in a first controller (30), identification of deviating sensor data (A) in the first controller (30) takes place during a determined time period (T), information about identified deviating sensor data (A) is stored in the memory (26), a key indicator (41, 42) that describes a current operational parameter for the demolition robot during the determined time period, during which deviating sensor data (A) are identified, is ascertained in a
(Continued)

second controller (32), and the key indicator (41, 42) as well as information about identified deviating sensor data (A, 43) to the determined time period (T) are presented in a user interface (28).

10 Claims, 6 Drawing Sheets

(58) Field of Classification Search
USPC .......................................................... 701/50
See application file for complete search history.

(56) References Cited

U.S. PATENT DOCUMENTS

| | | | |
|---|---|---|---|
| 9,283,674 B2 | 3/2016 | Hoffman et al. | |
| 11,686,070 B1* | 6/2023 | Jordan | E02F 9/264 340/468 |
| 11,746,501 B1* | 9/2023 | Gajić | E02F 9/2054 701/27 |
| 2003/0058087 A1* | 3/2003 | Wenzel | E02D 5/26 340/425.5 |
| 2009/0018712 A1* | 1/2009 | Duncan | G09B 19/167 701/2 |
| 2009/0096405 A1* | 4/2009 | Flickinger | G01R 31/343 702/183 |
| 2010/0219950 A1* | 9/2010 | Kong | G06K 7/10009 702/182 |
| 2011/0259258 A1* | 10/2011 | DePiero | G01D 21/00 116/200 |
| 2012/0101793 A1* | 4/2012 | Cheriere | G06F 11/079 703/8 |
| 2015/0046004 A1* | 2/2015 | Kitamura | H02J 7/1423 180/65.265 |
| 2015/0304612 A1* | 10/2015 | Richards | H04N 7/188 348/159 |
| 2015/0352655 A1* | 12/2015 | Watters | G05D 16/20 700/282 |
| 2017/0183085 A1* | 6/2017 | Branthomme | B64C 17/10 |
| 2018/0154908 A1* | 6/2018 | Chen | B60R 25/102 |
| 2019/0130501 A1* | 5/2019 | Erestam | G06Q 50/08 |
| 2019/0161944 A1* | 5/2019 | Olsson | E02F 3/966 |
| 2019/0224846 A1* | 7/2019 | Pivac | B25J 9/1664 |
| 2019/0249394 A1* | 8/2019 | Mehra | E02F 9/261 |
| 2019/0257100 A1* | 8/2019 | Olsson | E21B 15/003 |
| 2020/0218217 A1* | 7/2020 | Li | G06F 11/3058 |
| 2021/0010239 A1* | 1/2021 | Ono | E02F 9/2041 |
| 2021/0164811 A1* | 6/2021 | Liang | G02B 26/0841 |
| 2022/0002976 A1* | 1/2022 | Fukuoka | E02F 9/16 |
| 2022/0048742 A1* | 2/2022 | Kärki | B66C 13/40 |
| 2022/0120056 A1* | 4/2022 | Andersson | E02F 9/264 |
| 2023/0157757 A1* | 5/2023 | Braido | G06T 19/003 345/419 |
| 2023/0177894 A1* | 6/2023 | Ogasawara | G07C 5/0808 701/31.7 |
| 2023/0192227 A1* | 6/2023 | Wismann | B62K 21/12 701/60 |
| 2023/0299836 A1* | 9/2023 | Zhou | H04B 7/06954 370/329 |

FOREIGN PATENT DOCUMENTS

| | | |
|---|---|---|
| EP | 2749977 | 7/2014 |
| SE | 542381 C2 | 4/2020 |
| WO | WO-2016115499 A1 | 7/2016 |
| WO | WO-2017069689 A1 | 4/2017 |
| WO | WO-2017213580 A1 | 12/2017 |
| WO | WO-2018080385 A1 | 5/2018 |

OTHER PUBLICATIONS

Derlukiewicz et al., (2017). "The Numerical-Experimental Studies of Demolition Machine Operator Work," Computer Aided Engineering, Springer (Proceedings of the 13th International Scientific Conference), pp. 129-138.

Husqvarna, (2016). "Operator's manual DXR250," available online at <https://www.manualslib.com/manual/1320289/Husqvarna-Dxr250.html>, 84 pages.

Derlukiewicz et al., (2016). "Proactive Failure Prevention by Human-Machine Interface in Remote-Controlled Demolition Robots," Advances in Intelligent Systems and Computing, 445:711-720.

Office Action and Search Report received for Chinese Patent Application No. 202080011997.4 mailed on Apr. 11, 2023, 21 pages. English translation.

Corucci et al., (2015). "Toward Autonomous Robots for Demolitions in Unstructured Environments," Intelligent Autonomous Systems, 13:1515-1532, 17 pages.

Husqvarna, (2018). "Operator's manual DXR140," available online at <https://www.manualslib.com/manual/3085569/Husqvarna-Dxr140.html#product-DXR140>, 60 pages.

* cited by examiner

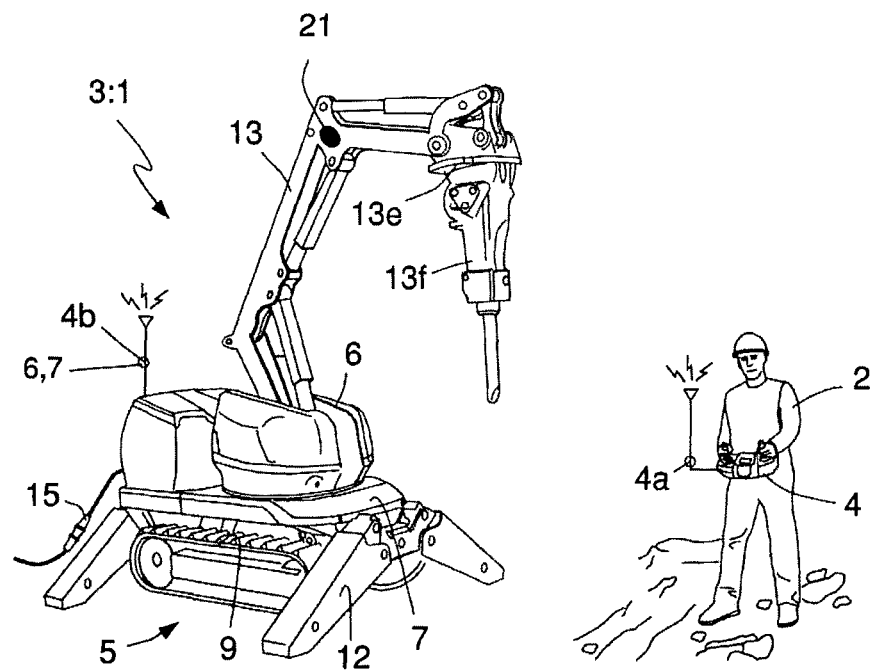
FIG.3
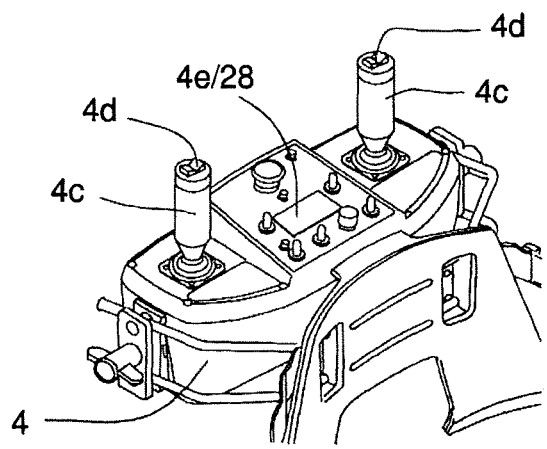
FIG.3A
FIG.3B
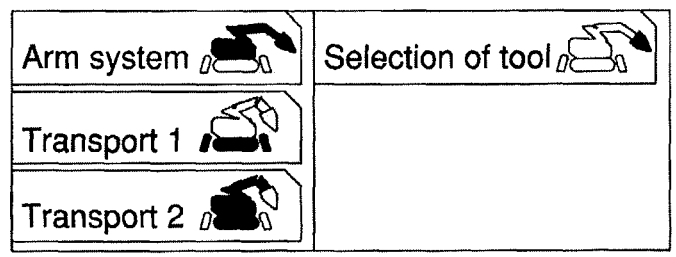

METHOD, DEVICE AND USER INTERFACE FOR PRESENTATION OF INFORMATION DESCRIBING A RUNNING OPERATING CONDITION OF A DEMOLITION ROBOT

CROSS REFERENCE TO RELATED APPLICATIONS

This application is a national stage application under 35 U.S.C. § 371 of International Application No. PCT/SE2020/050064, filed internationally on Jan. 28, 2020, which claims priority to SE 1950134-5, filed Feb. 5, 2019, the entire contents of each are incorporated by reference herein.

FIELD OF THE DISCLOSURE

The present invention relates to a demolition robot and in particular to a method, presenting user information about a running operating condition of a demolition robot. The invention also relates to an arrangement for the execution of a method as well as a user interface, presenting a running operating condition of a demolition robot.

BACKGROUND OF THE DISCLOSURE

Modern information technology has given us the possibility of collecting data from the electronic control units and data networks that are included in the control systems of today's vehicles and working machines, for instance data for error diagnostics in the case of damage to machinery or failure and relating to how and when a machine is operated. Data are obtained from a number of sensors arranged in the vehicle or working machine, so that this data can be recorded and compiled into a specific data file for each recording instance. The information collected in this manner can be stored in a database in a main server and be used for a range of various purposes. The data stored in the main server can, for instance via the internet, be available to external clients via PCs or smartphones.

A limitation of prior art control systems is that they do not send out warnings and generate error diagnostics data until after an error has already occurred. However, in many cases there is a need for being able to predict the risk of errors occurring or at least being able to alert a user about it to reduce the risk in this way, not just that an error occurs, but also that a major, more extensive damage to machinery occurs.

SUMMARY OF THE DISCLOSURE

A demolition robot is a robot vehicle, which is usually remote-controlled by a user (operator), who walks beside the demolition robot and remote-controls it, by means of a remote-control device, which via a strap or the like is suspended on the user's body.

A demolition robot typically has an undercarriage with a propulsion unit, which can comprise tracks and, on said undercarriage in a horizontal plane, a rotatable top carriage with an operable arm means, which at a free end has a so-called quick connection by means of which the demolition robot can carry various types of tools. The tool that the demolition robot carries in specific situations, for instance a hydraulic hammer, concrete crusher, saw or the like, depends on the current field of application or work task. The work is usually performed by a combination of various work elements, for instance crushing or chiseling of concrete with hydraulic hammers, cutting of steel reinforcement as well as disposal of removed building materials.

The remote-control device comprises a first and a second operating lever and/or buttons, with which the user can cause the demolition robot to perform desired movements and functions. Furthermore, the demolition robot has a number of various working functions or working modes, which are optional by means of the remote-control device. A generally applicable working mode can be "Working function undercarriage" for moving the demolition robot by means of the propulsion unit, or "Working function arm system" for performance of working movements by way of the arm means. The functions of the respective control sticks and/or the buttons are related to each specifically selected working mode, such that for instance in the "Working function undercarriage" working mode, the demolition robot can be moved by affecting the control sticks and in the selected "Working function arm system" working mode, the arm means is moved by affecting the control sticks.

As described above, demolition robots are intended to be used for a number of various purposes and have, at least theoretically, an endless number of potential settings that a user can apply depending on the relevant work task for the demolition robot. With assistance from the control sticks and buttons of the remote-control device, the demolition robot's various functions and movements can be controlled and managed, for instance the arm means and a working tool attached thereto can be raised and lowered and adjusted in a wide range of alternative angle positions.

Even if the user of the demolition robot is very experienced, it can be difficult for the user to sensorially assess the running operating condition of the demolition robot in such good time that damage to the machinery can be avoided. If a user should be able to obtain information, which at an early stage can suitably alert or warn the user as a supplement to said failure in sensorial information, damage to the machinery could be avoided in many instances. In this context, sensorial relates to the type of information that can be communicated to a user (individual) through the various sensory organs of the body.

Unlike a conventional excavator, wherein a user drives the machine in a cab, a user of a demolition robot, who during remote control walks beside the machine, has no possibility of noticing sensorial information, for instance from the heaviness of the extended arm means, trembling, vibrations or lurches of the demolition robot, which an excavator driver in a cab can usually experience. In short, the user situated at a distance has limited possibilities of "sensing" the mode of action and operational mode of action of the demolition robot during work.

Moreover, there is a need for making it possible for a more general user, for instance a constructor or a technician at a machine manufacturer via error diagnostics, to better understand the running operating condition of a demolition robot, in particular in respect of the risk of damage that may arise during work. Thus, the constructor or technician at the machine manufacturer can modify or optimize the construction of the demolition robot or carry out error search more efficiently.

Usually, error search in the case of damage is difficult and time-consuming for a technician, who needs to localize or diagnose it. Very rarely, a user can account for an entire causal connection, i.e. "cause/effect" towards the technician. The user can normally describe the "effect", i.e. that the machine works in an unexpected way, sounds strange in certain running modes, that the machine becomes overheated or the like. Unfortunately, the user can rarely or never submit information about the actual cause of a sudden change in the machine's running working condition. In this situation, questions about warranties may also arise as well as questions about whether the demolition robot is used in the correct manner in case of damage.

In order to make amends for the problems stated above, there is a need for providing a user interface, which makes it possible to take precautionary measures and present information that describes a running operating condition of a demolition robot to a user. The expression "damage-limiting" hereby means that the user can obtain preventive information, which at an early stage can alert or warn the user in a suitable way about the running operating condition of the machine.

As mentioned initially, it is a limitation of prior art control systems is that they do not send out warnings and generate error diagnostics data until after an error has occurred. However, in many cases there is a need for being able to predict the risk that errors may occur and alert a user about it to thereby reduce the risk that a major, more extensive damage to machinery occurs.

In summary, today solutions are lacking that enable a user to monitor the demolition robot's various operating states (running operating condition).

A first object of the present invention is thus to provide a method presenting user information that describes a running operating condition of a demolition robot. Another object of the invention is to provide an arrangement for executing the method, and a third object of the invention is to provide a user interface for the presentation of a running operating condition of a demolition robot.

These objects of the invention are obtained through a method, which is set forth in claim 1, a demolition robot as set forth in claim 10, and a user interface.

BRIEF DESCRIPTION OF THE FIGURES

In the following, the invention is described in more detail based on an exemplary embodiment, shown in the accompanying drawing: wherein;

FIG. 3A shows a perspective view from above of a remote-control device, as it is normally seen by a user when operating the demolition robot, FIG. 3B shows a composition of various optional operating modes of the demolition robot, which can be set by a user by means of the remote-control device and symbols that are shown in a user interface for the user when switching.

With reference to FIG. 1, a system 1 is shown with which it is possible for a user 2 to present a running operating condition of one or a plurality (n) of remote-controlled demolition robots 3:1-3:n, which can be included in or form part of a major fleet. The running operating condition of each demolition robot can be measured and comprises according to the invention a momentarily occurring steady-state, i.e. vibration cycles of temporary or just very short duration, which via the sensors arranged in the demolition robot can be measured. Collected sensor data can via a user interface, such as graphically via a display unit or in another suitable manner, wherein said sensor data are compiled into operation-describing data, be communicated to a user. In the following, the expression data relates to technical representation of information, which can be stored in a file in a computer, and the expression data file relates to a collection of data (information), which are stored under a file name in a file system. Raw data is information, which is collected from a source, but has not undergone processing or other manipulation.

Figure 1:
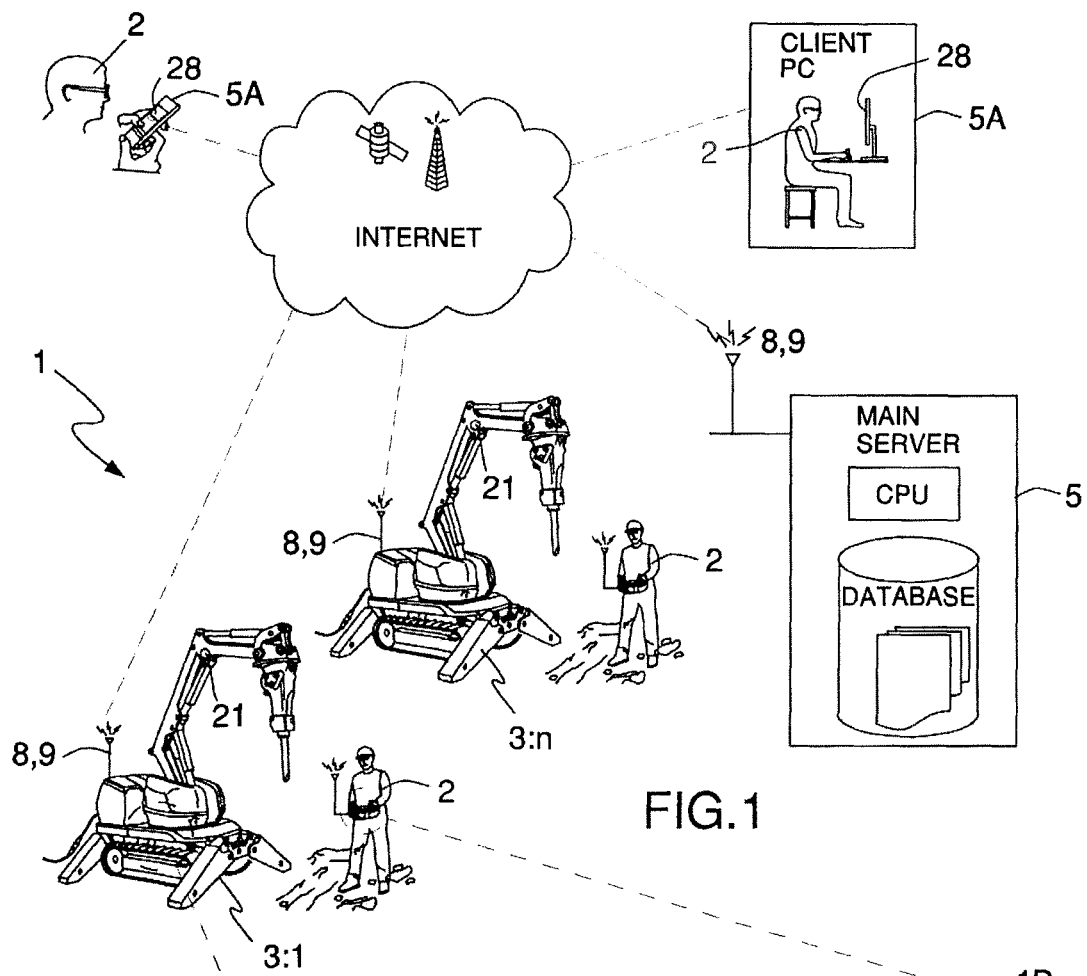
FIG. 1 schematically shows a block diagram of a system for presentation of user information, describing a running operating condition of one or a plurality, i.e. an entire fleet of demolition robots according to the present invention, FIG. 2 schematically shows a block diagram of a typical structure of a system for presentation of user information, describing a running operating condition and is included in a demolition robot according to the present invention, FIG. 3 schematically shows a demolition robot that is controlled and managed by a user (operator), who walks beside the machine.

Said sensors can record data (raw data), which can detect dangerous pressure or line surges or similar temporarily occurring strains of the demolition robot, which can depend on the operation or operating state of the demolition robot, for instance depending on how a user handles or operates the demolition robot.

It is thus desirable to make it possible through measuring to control the demolition robot's running operating condition and via a user interface communicate the user information describing the running operating mode to a user, for instance an operator, a constructor or the like, who has an interest in known the operating status of the demolition robot. The user to whom information describing the demolition robot's operating state can include a skilled user (machine operator), a machine developer or constructor, a user (machine operator) undergoing training, a machine contractor, who owns a major fleet of demolition robots or anybody, who has an interest in the current operating condition or operating status of a demolition robot. In this invention, the expression "user" is used in the widest meaning of the term.

It should be understood that a fleet can comprise hundreds of or more demolition robots 3:1-3:n. Said demolition robots 3:1-3:n can be of any type, which is intended for being operated by remote control, and wherein a user 2 (operator) during remote control walks beside a demolition robot or controls the machine outside the range of vision through so-called indirect viewing.

The illustrated system 1 has a "machine side", generally denoted 1A, wherein each demolition robot 3:1-3:n comprises a remote diagnostics unit 10, which will be described in more detail below. The system 1 further has a "user side" generally denoted 1B, which in one embodiment can comprise a main server 5 with an input/output interface, a central processing unit (CPU) and a database 5B.

Via the internet or a similar wireless link, for instance via a radio link, satellite or short-range data communication, such as for instance Wi-Fi, an optional number of clients 5A (users), via PC or smart phone, can connect electronically to the main server 5. With suitable application or software, a client can process data, which are stored in the database 5B.

FIG. 3 shows a demolition robot 3:1 in more detail. A user 2 walks beside the demolition robot an remote-controls it wirelessly via a remote-control device 4, comprising a transmitter/receiver unit 4a, 4b. A chassis with a carriage having a top carriage 6 and an undercarriage 7 is generally denoted 5. The top carriage 6 is twistably bedded on the undercarriage 7 for swinging in a horizontal plane. The undercarriage 7 is provided with a propulsion device comprising right respectively left tracks. Support legs are denoted 12 and are operated by associated hydraulic cylinders, and an operable arm means, denoted 13, is sustained on the top carriage 6 and is operable by means of hydraulic cylinders. A cable is denoted 15 and is intended to be connected to a stationary electric network to provide the demolition robot 1 with electric power. The arm means 13 is at its free end provided with a tool attachment 13e, in which various types of tools 13f can be removably arranged and optionally also be connected for hydraulic operation. The tool 13f can be activated for operation by means of the remote-control device 4.

As shown in FIGS. 3A and 3B, the remote-control device 4 comprises control sticks 4c and buttons 4d, which can be operated by the user 2 to control and manage the demolition robot's various functions. As shown in FIG. 3B, the user 2 can adjust the demolition robot in various operating modes via the remote-control device 4. Depending the operating mode selected for the demolition robot 3:1, the control sticks 4c will control various functions of the demolition robot 3:1. The selected working mode can be shown by means of symbols in a user interface 28 in the form of a display unit 4e in the remote-control device 4.

As shown in FIG. 3B, generally applicable optional running modes can comprise "transport mode", wherein the demolition robot can be moved through the action of a control stick 4c, or "running mode", wherein the arm means 13 can carry out operating movements through the action of control sticks 4c.

Figure 2:
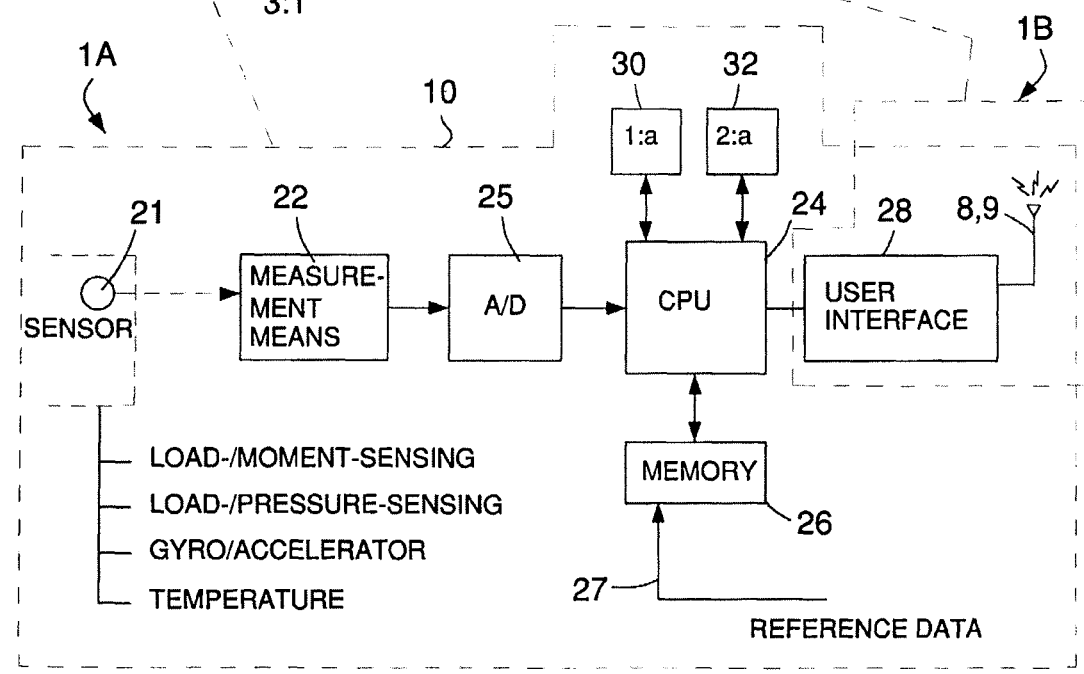

With reference to FIG. 2, the remote diagnostics unit 10, included in and on board each demolition robot 3:1-3:n, comprises a transmitting and receiving means 8, 9, which enables communication of data between the demolition robot 3:1 and the main server 5, wherein said data can describe a running operating condition of the demolition robot.

In an alternative embodiment, said operating data can be compiled into a data file db:1-db:n in in the control unit 24 of the remote diagnostics unit 10, before it is addressed to the main server 5. Communication can concern transfer of operating data from the demolition robot 3:1 to the main server 5 or control and/or updating of software in the demolition robot's control unit. The transmitting and receiving means 8, 9 are suitably selected, so that they allow wireless two-way communication, wherein data can be transferred from the demolition robot 3:1 to the main server 5 and vice versa from the main server 5 to the demolition robot.

The remote diagnostics unit 10 can comprise one or a plurality of sensors 21, wherein each sensor can detect the occurrence of a steady-state of the demolition robot 3:1. In an exemplary object, the demolition robot 3:1 is provided with a single sensor 21, namely a load-/pressure-sensing one, which can for instance sense current sensor data in the form of a monetarily occurring tensile or compressive stress in a portion of the demolition robot's 3:1 arm means 13, wherein the variable measurement value can depend on the demolition robot's 3:1 running operating states or operating condition.

As illustrated in FIG. 2, the invention is not limited to use load/pressure sensors 21, but can obviously also comprise any type of suitable sensors that are required to enable the user to monitor the operating condition of the demolition robot in a better way. For instance, it could be sensors 21 that can use statically or dynamically occurring loads, hydraulic pressure, gyro sensors for detecting lurching or a changed inclination angle of the demolition robot or a temperature-detecting sensor, position/state sensors between mutually moveable machine parts, gyro/accelerator sensors etc.

The remote diagnostics unit 10 comprises a measurement means 22, which is coupled to the exemplified sensor 21 for measurement of current sensor data, comprising a steady-state in said portion of the arm means 13. Furthermore, a microprocessor-based processing unit (CPU) 24 is coupled to the measurement means 22 and an A/D converter 25 arranged between said measurement means 22 and the control unit. It should be understood that the component choice indicated in this exemplified object between sensor 21 and control unit 24 is not limiting for the invention, but can vary depending on the type of sensor and the steady-state of the demolition robot 3:1 to be measured.

Moreover, for the control unit 24 a memory 26 is arranged, in which a data file with specific reference data 27 can be recorded, which suitably takes place in connection with manufacturing of the demolition robot, alternatively a suitable reference data file can be transferred from the main server 5 to the memory 26. The memory 26 can communicate with the transmitting/receiving means 8, 9 for relaying of current sensor data from the demolition robot's 3:1 remote diagnostics unit 10 to a user interface 28 for a user 2.

It should be understood that according to the present invention the term user interface 28 should be interpreted in its widest meaning and include both the display 4c, which the remote-control device 4 is provided with and the monitor or display, which can be included in a client's PC or smartphone that is connected to the master computer 5. In the former situation, operating data describing the demolition robot's 3:1 operation or operating state, by suitable processing in the control unit 24 are presented immediately on a user interface 28, which is constituted by the remote-control device's 4 display 4c without said operating data needing a detour over the system's main server 5. In the latter situation, the operating data that describe the demolition robot's 3:1 operation or operating state can be presented to a user 2 in a user interface 17 stored as a file, i.e. a data file db:1-db:n describing the operation and which is retrieved from the main server 5.

The remote diagnostics unit 10 further comprises a first controller 30, in which current sensor data that deviate from the recorded specific reference data 27 and thereby can affect the demolition robot's running operating mode can be identified. Identification of sensor data in the first controller 30 can take place during a specified time period, and information about identified sensor data can be stored as a file in the memory 26.

Current sensor data relate to a steady-state, i.e. vibration cycles with temporary or just of very short duration and that the steady-state comprises data from at least one of the following sensors: load sensors, pressure sensors, temperature sensors, power sensors, voltage sensors.

The remote diagnostics unit 10 further comprises a second controller 32, in which a key indicator 40 describing a current operational parameter in the demolition robot during the specified time period, during which identified sensor data have been established. Operating parameter relates to the demolition robot's 3:1 specific operation or operating state during the specified time period "T", during which deviating sensor data are identified "A". According to the present invention, the key indicator 40 describing operation during the determined time period "T" as well as information about identified sensor data to the determined time period lapsed are recorded in a data file, which can be presented in a user interface 28.

The key indicator 40 could for instance comprise one of the following current operational parameters: an operating working function selected by the user relating to undercarriage, top carriage, turning device, propulsion device, arm system, tool or;

a system function incorporated in the demolition robot, which can for instance relate to power supply, battery, radio link, electrical system, hydraulic system.

It should be understood that in practice each of said first respectively second controllers 30, 32 comprises software that is implemented in the control unit 24. In the first controller 30, current sensor data 21 obtained from the measurement means 22 are compared with corresponding specific reference data 27, which are stored in the memory 26.

The key indicator 40 that is determined by the second controller 32 describes an operation or an operating state in a control unit 24 during the determined time period, during which the current sensor data that deviate from specific reference data are identified. The key indicator 40 can for example describe a measure indicating a function (working mode) selected by the user or a running operation of the demolition robot via the remote control device 4.

Figure 4:
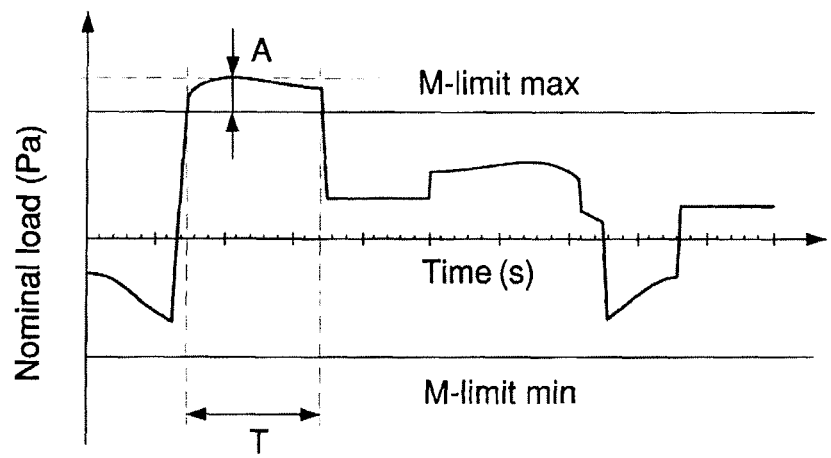
FIG. 4 shows a diagram with a graph, which illustrates a fictional scenario with a load/pressure curve, which is obtained from a sensing element/sensor and measurement means in the demolition robot as well as reference data with pre-determined Max/Min limits for loading, which when exceeded can affect the running operating condition of the demolition robot.

The diagram in FIG. 4 shows a graph that illustrates a scenario with current sensor data in the form of a load/pressure curve that is obtained from the exemplified sensor 21 and specific reference data in the form of measurement values with Max/Min limits that are recorded in the memory 26. When comparing these, it appears that the load/pressure curve in the portion denoted "A" has a load exceeding the Max limit of specific reference data and can thereby affect the running operating condition of the demolition robot or result in damage to the machinery. According to the invention, sensor data identified in this way are thus denoted "A" in FIG. 4.

As the load/pressure curve in "A" has a condition with a load exceeding a Max limit of specific reference data, the conditions for recording of data files are met, whereby, according to the invention, a number of successively created data files can be recorded with instructions about a key indicator 40 describing current operational parameters as well as information about identified sensor data within a pre-determined amount of data during the time "T" that the state takes.

Figure 5:
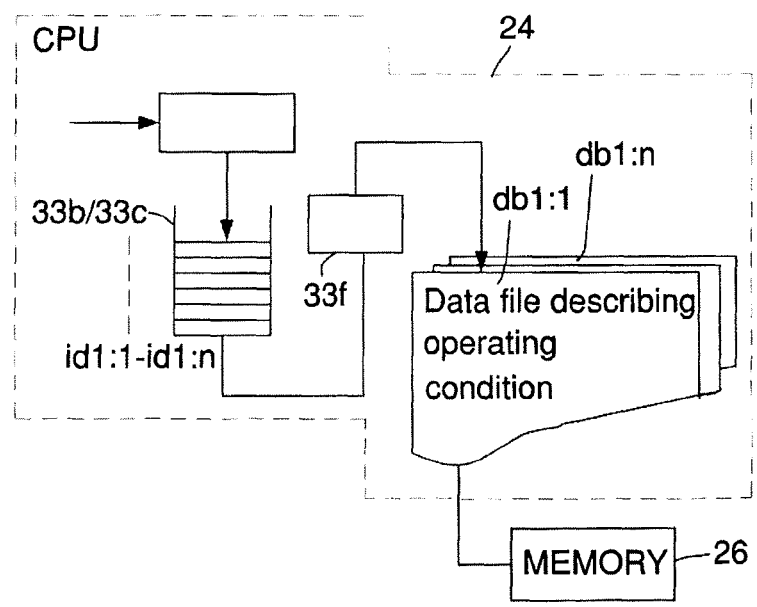
FIG. 5 shows a flow chart, illustrating how a data transmission interface for communication with a running operating sensor and logging of data files with operating data can work according to the invention.
Figure 6:
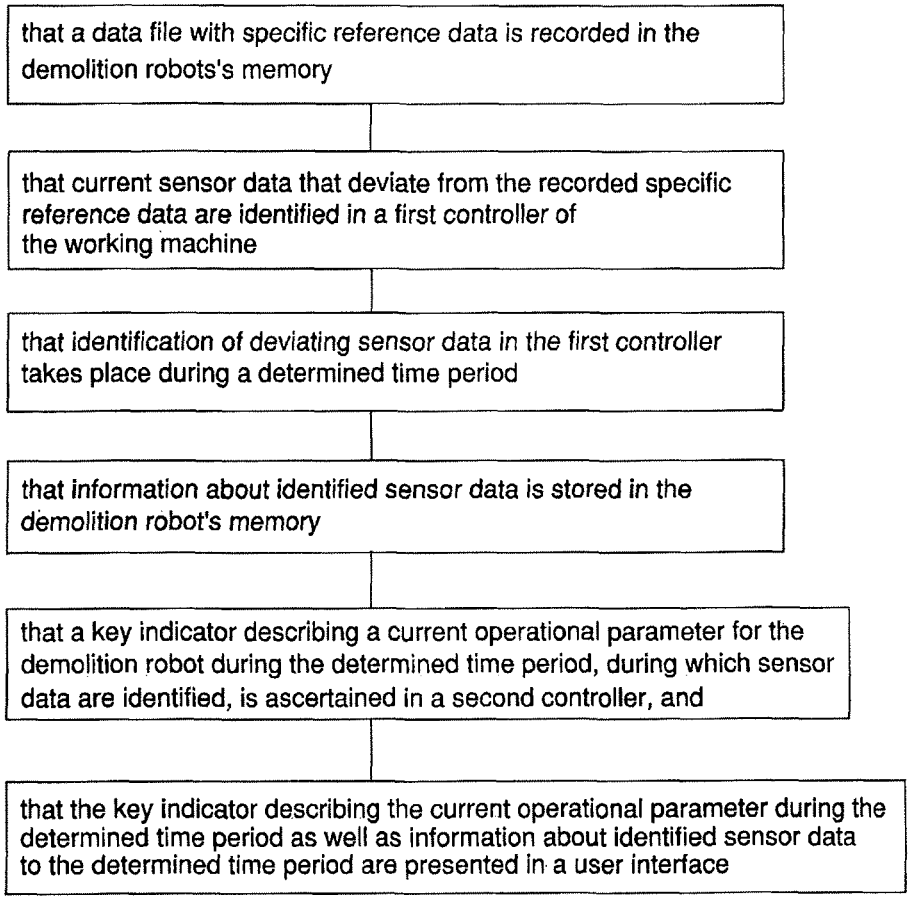
FIG. 6 illustrates a method of presenting user information, describing a running operating condition of a demolition robot, and FIGS. 7A-7D schematically illustrate examples of various user interfaces for presenting a running operating condition of a demolition robot according to the invention.

FIG. 5 further shows how a data-transmitting interface for communication with the remote diagnostics unit 10 and logging of data files with running operating data can work in the situations, where the load/pressure curve in "A" shows a state with a load that exceeds a Max limit of specific reference data. In a FIFO buffer 33b, 33c, a queue of data flows are alternately sampled and stored, successively forming a series of data files id1:1-id1:n describing the operation. Each operation-describing data file id1:1-id1:n thus constitutes a kind of process image of a process state for the demolition robot 3:1 in a certain moment or time interval "T" as conditions "A" for recording data files are met.

Conditions for recording of data functions usually only come into force in the situations and during the time "T" that the first controller 30 detects that current sensor data 21 deviate from recorded specific reference data 27. A unique so-called log storage function, for example in the form of a timing marker, can by means of a clock be assigned to each initiated data file id:1:1-id1:n via a logging means 33f.

Figure 7A:
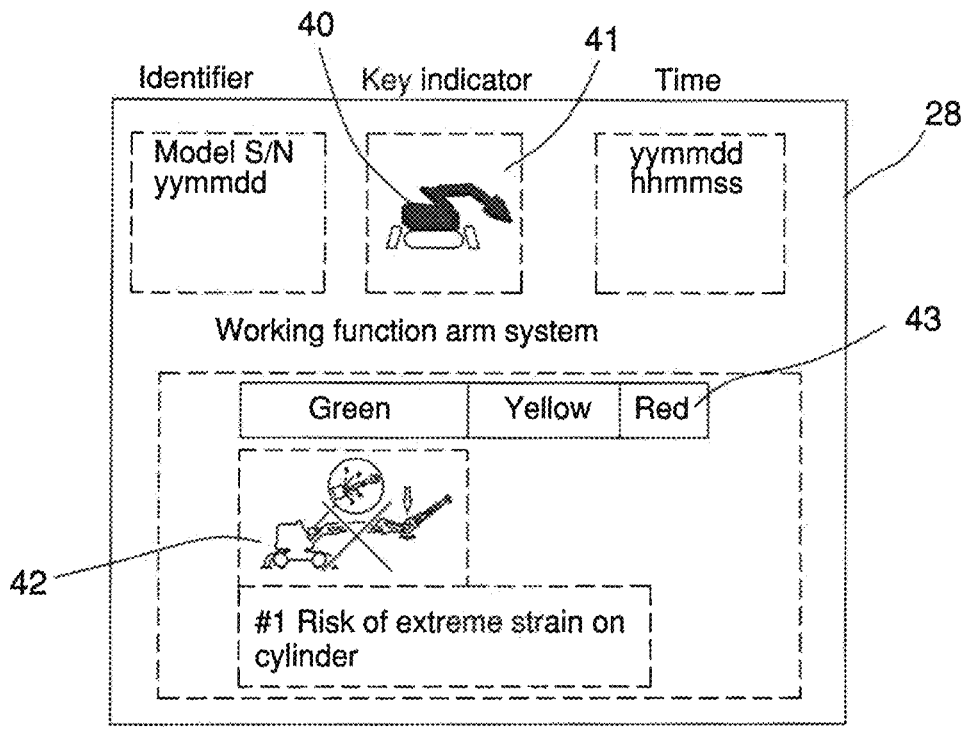
Figure 7B:
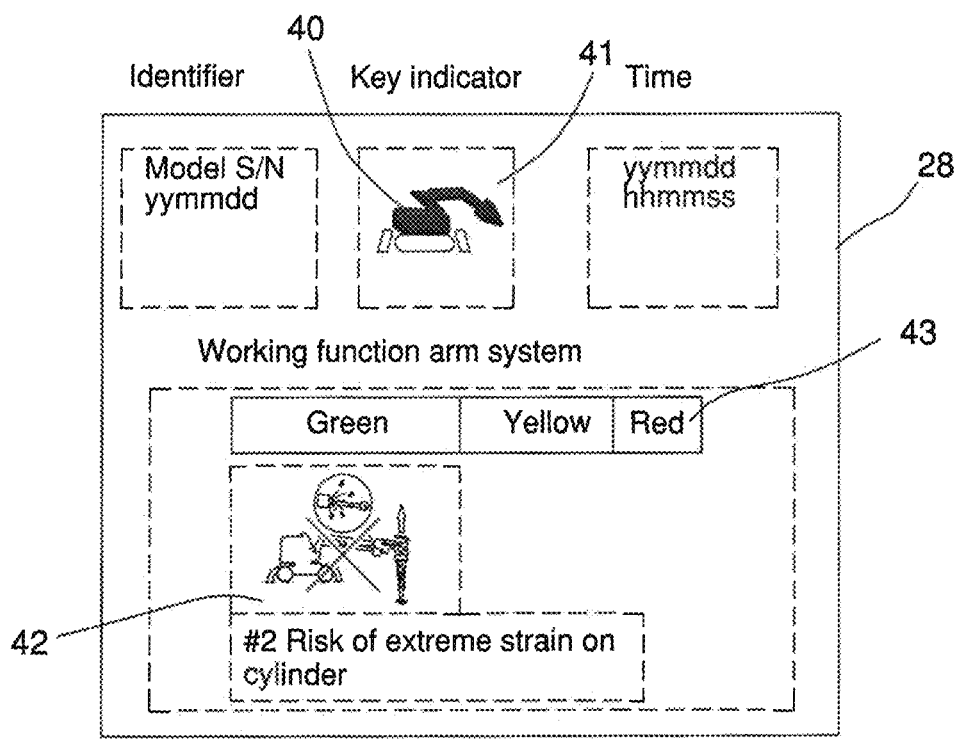

FIG. 7A shows a user interface 28, which in an embodiment of the invention will be visible to the user immediately on the remote-control device's 4 screen or display 4e, alternatively in a second embodiment of the invention on the screen that is included in a PC or smartphone connected as client to the main server 5.

The user interface 28 can comprise a first user interface element 41 configured to visually show at least a first graphic representation on the screen 4e that creates a key indicator 40 describing a current operational parameter of the demolition robot.

The term graphic relates to various ways of combining words, symbols or images to create a visual representation of a message intended to be communicated.

In the example in FIGS. 7A-7D, the first graphic representation relates to an image illustrating a working function selected by the user via the remote-control device 4, namely "Working function arm system", "Working function arm system", "Working function undercarriage" respectively "System function electric power".

Figure 7C:
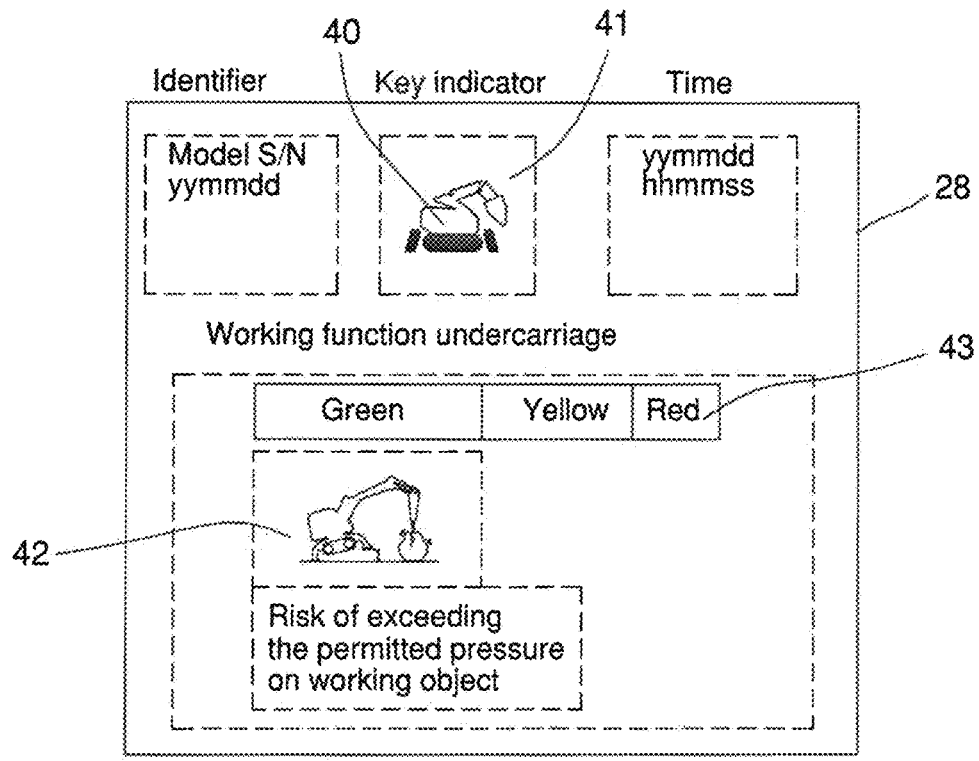

The user interface 28 also comprises a second user interface element 42, configured to show a second graphic representation on the screen 4e that creates a key indicator 40 describing a current operational parameter. In the example in FIGS. 7A-7B, this second graphic representation relates to a visual image that informs the user that the arm means 13 is operated into a mode that involves risk of extreme strain on the arm means. In FIG. 7C the user is informed that the arm means 13 is operated in a mode that involves risk of exceeding the permitted pressure on a working object and hence overstressing the demolition robot, while in FIG. 7D, the user is informed that limited power supply is detected.

The user interface 28 further comprises a third user interface element 43 configured to show a third graphic representation on screen 4e as for example by means of colour perception, wherein the colours green, yellow and red describe a current operational parameter in the form of a scale that visually can inform the user about the degree of stress on current sensor data 21. This means that the third user interface element 43 in a simple manner provides the user with information about how current sensor data 21 deviate from recorded specific reference data.

The object according to the invention of presenting, in a user interface, a combination of a key indicator 40 describing the current operational parameter as well as information about current sensor data 21 that deviate from recorded specific reference data 27 is to be able to inform a user 2 about a running operating condition of the demolition robot. In an embodiment, the information in the user interface 28 can be used in the object of early alerting a user 2 of an existing causation, i.e. supply information about both the cause and effect at the risk of damage to machinery.

Figure 7D:
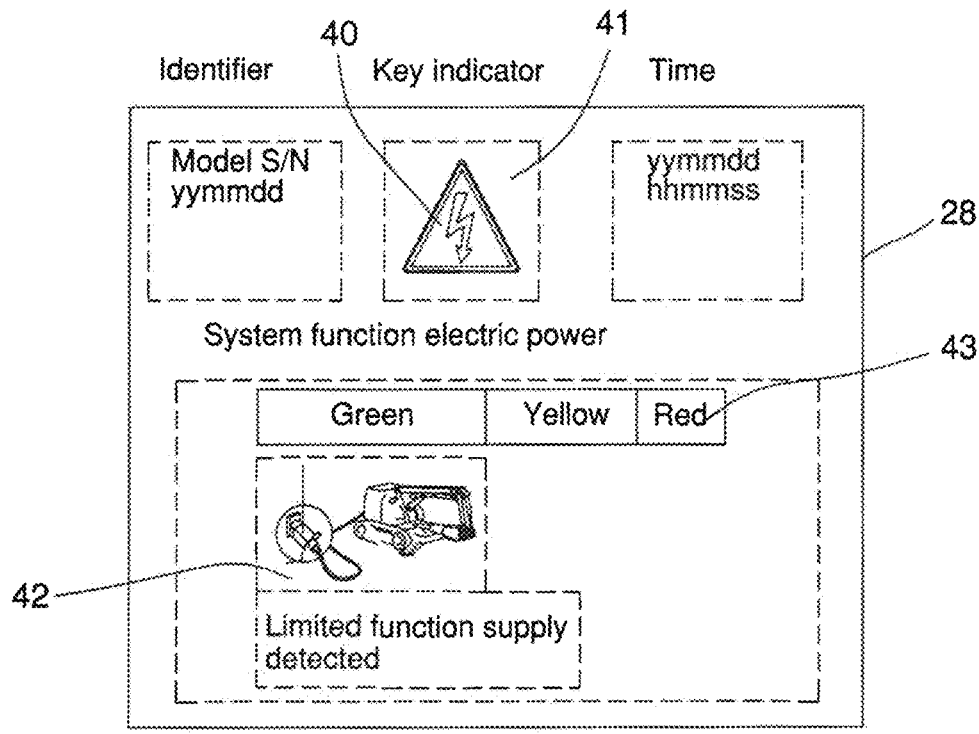

The advantages of presenting a combination of a key indicator 40 describing a current operational parameter and identified deviating sensor data in a user interface should be evident through a more detailed explanation of the information and the conclusions that a user can draw from the graphic representation shown in FIG. 7D.

In the user interface 28 in FIG. 7D, it appears from the first user interface element 41 and the second user interface element 42 that the key indicator 40 relates to "System function electric power" and that "limited power supply is detected" in the cable that provides the demolition robot 3:1 with electric power.

A demolition robot 3:1 is usually run by an electric three-phase AC motor. It should be generally known that an electric motor can overheat during certain unfavourable operating conditions. Limited power supply to the motor in some of the three phases is a known condition that can result in overheating.

In a normal case, without the present invention, a user could substantially just ascertain the one connection of both empirical phenomena that together form a causation (cause and effect), namely "that the motor overheats" i.e. the phenomenon "effect". In for example error search, the user 2 could thus just communicate that "the motor overheats" to a technician. Consequently, it will be very difficult for the technician to localize the error source, i.e. to find the underlying cause of the overheating.

Due to the present invention, wherein in a user interface 28 presents information, which in combination describes a running operating condition, including both a key indicator 40 that describes a current operational parameter and information about identified current sensor data that deviate from recorded reference data, the user obtains a substantially more complete and informative causation.

Guided by current sensor data from for example current meters that monitor the current that is led through each separate conductor in the three-phase line 15, which supplies the demolition robot and after identifying the current sensor data that deviate from specific reference data, the present information system can present the following information that describes the following running operating condition of the demolition robot.

A key indicator 40 that describes the current operational parameter and identified sensor data of the kind shown in the user interface in FIG. 7D with all the information required for a user to be able to draw the conclusions of the existing causation, i.e. provide information about both cause and effect at the risk of damage to machinery.

The invention claimed is:

1. A method for presenting information that describes a running operating condition of a demolition robot, which is provided with a microprocessor with a memory for storing of data, wherein current data are obtained by one or a plurality of sensors, recorded, and compiled into a data file for each recording instance, characterized by the following operational steps,
   recording a data file with specific reference data in the demolition robot's memory,
   identifying current sensor data that deviate from the recorded specific reference data and thereby affects the demolition robot's running operating mode,
   wherein identification of deviating sensor data takes place during a determined time period,
   ascertaining a key indicator describing an operating working function selected by the user of the demolition robot during the determined time period, during which deviating sensor data are identified,
   storing, in the demolition robot's memory, the key indicator and identified deviating sensor data, and
   presenting, in a user interface, the key indicator and identified deviating sensor data for the determined time period.

2. The method according to claim 1, wherein the current sensor data comprise data from a steady-state and which sensors comprise at least one of the following: load sensor, pressure sensor, temperature sensor, power sensor, voltage sensor, position sensor, gyro sensor.

3. The method according to claim 1, wherein the operating working function selected by the user relates to undercarriage, top carriage, turning device, propulsion device, arm system, or tool.

4. The method according to claim 1, wherein specific reference data comprise load-limiting data relating to occurring stress of material, temperature, or pressure.

5. The method according to claim 1, wherein specific reference data are recorded in the demolition robot's memory at manufacturing.

6. The method according to claim 1, wherein specific reference data comprise measurement value in an interval with an upper maximum limit and a lower minimum limit.

7. The method according to claim 1, wherein deviating sensor data are identified by comparison between current sensor data and specific reference data during the determined time period.

8. The method according to claim 1, wherein data processing of identified deviating sensor data takes place on board the demolition robot.

9. The method according to claim 1, wherein the data file is stored in the memory included in the demolition robot, and the data file is assigned a log storage function via a logging means.

10. A device for presentation of information describing a running operating condition of a demolition robot for a user, which device has at least a demolition robot comprising,
    a microprocessor with a memory for storage of data,
    one or a plurality of sensors, wherein current data from said sensors is recorded and compiled into a data file in the microprocessor's memory,
    characterized in that the device further comprises,
    a data file with specific reference data included in the memory,
    a first controller, in which current sensor data is identified that deviate from recorded specific reference data and thereby affects the running operating condition of the demolition robot, wherein identification of deviating sensor data in the first controller takes place during a determined time period,
    a second controller, in which a key indicator is ascertained, describing an operating working function selected by a user of the demolition robot during the determined time period, during which the deviating sensor data are identified, and the key indicator and identified deviating sensor data are stored in the demolition robot's memory,
    a user interface, in which the key indicator and identified deviating sensor data for the determined time period is presented.

* * * * *